United States Patent Office 3,098,091
Patented July 16, 1963

3,098,091
AMINOALKYL ESTERS OF ETHER SUBSTITUTED DITHIOCARBAMIC ACIDS
John J. D'Amico, Nitro, W. Va., assignor to Monsanto Chemical Company, St. Louis, Mo., a corporation of Delaware
No Drawing. Filed Apr. 14, 1958, Ser. No. 728,101
8 Claims. (Cl. 260—455)

The present invention relates to a new class of compounds, the aminoalkyl esters of ether substituted dithiocarbamic acids, to pesticide compositions containing them and to methods for using these compounds to control or destroy various economic parasites.

The new compounds are characterized by the presence of an aminoalkyl group as the ester radical, and by one ether substituent and one hydrogen as the substituents on the nitrogen of the acid radical. By ether substituent is meant a radical RXA—where R represents a hydrocarbon radical, X represents a chalkogen of atomic weight less than 40 and A represents an alkylene radical. The ether substituent attached to the nitrogen of the NCSS nucleus is preferably an alkoxy substituted lower alkyl group in which case A is lower alkylene. However, other ether substituents are contemplated and as hereinafter illustrated, are useful for the purposes of the invention. The ether substituent exerts an activating effect on the toxicity of the compounds to parasites. Examples of suitable ether substituents comprise 2-methoxyethyl, 2-ethoxyethyl, 2-methylthioethyl, 2-ethylthioethyl, 2-propylthioethyl, 2-isopropylthioethyl, 2-butylthioethyl, 2-propoxyethyl, 2-isopropoxyethyl, 2-butoxyethyl, 2-amyloxyethyl, 2-amylthioethyl, 3-methylthiopropyl, 3-ethylthiopropyl, 3-butylthiopropyl, 2-phenylthioethyl, 3-methoxypropyl, 3-ethoxypropyl, 3-propoxypropyl, 3-isopropoxypropyl, 4-methoxybutyl, 4-ethoxybutyl, 5-methoxyamyl, 3-butoxypropyl, 3-amyloxypropyl, propoxymethyl, butoxymethyl, 3,6,9-trioxadecyl, (R is 3,6-dioxaheptyl) 2-octyloxyethyl, 2-phenoxyethyl, 2-benzyloxyethyl, 3-vinyloxypropyl, 2-vinyloxyethyl and 2-allyloxyethyl radicals. It will be noted that an alkyl radical attached to X may contain 1 to 8 carbon atoms inclusive and that an alkenyl radical of less than 4 carbon atoms is suitable. In the aminoalkyl radical which serves as the ester substituent, the alkyl portion may be either straight or branched but should separate nitrogen and sulfur by at least two but not more than three carbon atoms. Exemplary of radicals which may connect the nitrogen and sulfur are alkylene containing less than four carbon atoms.

While the primary amino alkyl esters are suitable intermediates, parasiticidal utility requires replacement of at least one and preferably both of the hydrogen atoms. Amine radicals which are suitable constituents in compounds useful for this purpose comprise 2-dimethylaminoethyl, 2-diethylaminoethyl, 2-morpholinylethyl, 2-methylaminoethyl, 2-ethylaminoethyl, 2-butylaminoethyl, 2-cyclohexylaminoethyl, 2-dibutylaminoethyl, 1-methyl-2-dimethylaminoethyl, 2-phenylaminoethyl, 2-tert. butylaminoethyl, 3-dimethylaminopropyl and 2-diisopropylaminoethyl in which radicals the alkyl groups contain one to four carbon atoms inclusive.

The new compounds may be prepared by condensing a salt of the corresponding dithiocarbamic acid with a substituted aminoalkyl halide. For example, condensation of sodium methylthioethyldithiocarbamate and dimethylaminoethyl chloride in equimolecular proportions in aqueous medium yields dimethylaminoethyl methylthioethyldithiocarbamate. Alternatively, an aminoalkyl halide may be condensed with the salt of the dithiocarbamic acid and the free primary amino group converted to a substituted amino group. This may be accomplished by condensation with formic acid and formaldehyde to introduce methyl groups. The procedure for converting primary to tertiary amines is described by Kirby in U.S. Patent No. 2,366,534. The condensation of the dithiocarbamate and aminoalkyl halide proceeds smoothly in aqueous solution and any water soluble salt of the dithiocarbamic acid is suitable, as for example sodium and potassium salts. In general better yields have been obtained by employing the ammonium salts and the detailed examples below were carried out with ammonium salts. The new compounds are usually amber oils but in a few cases solid products are obtained. They are insoluble in water and heptane but soluble in polar organic solvents.

EXAMPLE 1

To a reactor was charged 46 grams (0.4 mole) of 65% aqueous 2-methoxyethylamine, 28.4 grams (0.45 mole) of concentrated ammonium hydroxide (density 0.9) and 300 ml. of water. The solution was stirred while adding dropwise at 5–15° C. 30.4 grams (0.4 mole) of carbon disulfide and then stirred at 20–30° C. for one hour. There was then added in one portion each 57.6 grams (0.4 mole) of 2-dimethylaminoethyl chloride hydrochloride and 28.4 grams (0.45 mole) of concentrated ammonium hydroxide. An exothermic reaction set in which caused the temperature to rise from 20 to 43° C. in one-half hour. The reaction mixture was stirred at 25–30° C. for 18 hours. To the stirred reaction mixture 400 ml. of ethyl ether was added. The ammonium chloride was removed by filtration. The top ether layer of the filtrate was washed with two 50 ml. portions of water and dried over sodium sulfate. The ether was removed in vacuo at a maximum temperature of 80–90° C. at 1–2 mm. to yield 2-dimethylaminoethyl 2-methoxyethyldithiocarbamate as an amber oil in 76.6% yield. It contained 12.8% nitrogen as compared to 12.6% calculated for $C_8H_{18}N_2OS_2$.

Other examples prepared by the same procedure as in Example 1 but substituting the appropriate amine are summarized in tabular form below. All were amber oils:

Table I

| Ex. No. | Amine | Product | Analysis | | |
|---|---|---|---|---|---|
| | | | Element | Calcd., percent | Found, percent |
| 2 | 2-vinyloxyethyl amine. | 2-dimethylaminoethyl 2-vinyloxyethyl-dithiocarbamate. | N<br>S | 11.9<br>27.4 | 11.6<br>27.2 |
| 3 | 3-methoxypropyl amine. | 2-dimethylaminoethyl 3-methoxypropyl-dithiocarbamate. | N<br>S | 11.9<br>27.1 | 11.8<br>26.5 |

EXAMPLE 4

A solution was prepared from 46 grams (0.4 mole) of 65% 2-methoxyethylamine, 28.4 grams (0.45 mole) of concentrated ammonium hydroxide and 200 ml. of water. The solution so prepared was cooled to 5° C. and 30.4 grams (0.4 mole) of carbon disulfide added dropwise while keeping the temperature of the reaction mixture at 5–15° C. The reaction mixture was then stirred at 25–30° C. for one hour after which 28.4 grams (0.45 mole) of concentrated ammonium hydroxide and 68.8 grams (0.4 mole) of 2-diethylaminoethyl chloride hydrochloride were added in one portion. The heat of the reaction caused the temperature to rise from 28° to 44° C. within half an hour. The reaction mixture was allowed to cool and stirring continued at 25–30° C. for 24 hours. The mixture was then extracted with 400 ml. of ethyl ether, washed with three 200 ml. portions of water, dried over sodium sulfate and the ether removed in vacuo at a maximum temperature of 30° C. at 1–2 mm. A 79% yield of 2-diethylaminoethyl 2-methoxyethyldithiocarbamate was obtained as an amber oil. It contained 25.6% sulfur as compared to 25.6% calculated for $C_{10}H_{22}N_2OS_2$.

Other examples prepared in similar manner by substituting the appropriate reactants in the foregoing procedure are summarized in tabular form below:

*Table II*

| Ex. No. | Product | Analysis | | |
|---|---|---|---|---|
| | | Element | Calcd., percent | Found, percent |
| 5 | 2-diethylaminoethyl 3-methoxypropyldithiocarbamate. | S | 24.3 | 24.7 |
| 6 | 3-dimethylaminopropyl 3-methoxypropyldithiocarbamate. | S | 25.6 | 25.6 |
| 7 | 3-dimethylaminopropyl 2-methoxyethyldithiocarbamate. | S | 27.1 | 27.4 |
| 8 | 1-methyl-2-dimethylaminoethyl 3-methoxypropyldithiocarbamate. | N | 11.2 | 11.0 |
| 9 | 1-methyl-2-dimethylaminoethyl 2-methoxyethyldithiocarbamate. | N | 11.9 | 11.2 |
| 10 | 2-diisopropylaminoethyl 2-methoxyethyldithiocarbamate. | S | 23.0 | 23.2 |
| 11 | 2-morpholinoethyl 2-methoxyethyldithiocarbamate. | N<br>S | 10.6<br>24.3 | 10.5<br>24.2 |
| 12 | 2-dipropylaminoethyl 2-methoxyethyldithiocarbamate. | N | 10.0 | 9.8 |
| 13 | 2-dipropylaminoethyl 3-methoxypropyldithiocarbamate. | N<br>S | 9.6<br>21.9 | 9.4<br>21.5 |
| 14 | 2-[N-(2-chloroallyl)-N-isopropyl-amino]-ethyl-3-methoxypropyldithiocarbamate. | N | 8.6 | 8.0 |
| 15 | 2-diisopropylaminoethyl 3-methoxypropyldithiocarbamate. | N<br>S | 9.6<br>21.9 | 9.5<br>21.3 |
| 16 | 2-[N-isopropyl-N-(2-propynyl)-amino]-ethyl 2-methoxyethyl-dithiocarbamate. | N | 10.2 | 10.4 |
| 17 | 2-diallylaminoethyl 3-methoxypropyldithiocarbamate. | N<br>S | 9.7<br>22.2 | 9.6<br>23.0 |
| 18 | 2-diallylaminoethyl 2-methoxyethyldithiocarbamate. | S | 23.4 | 23.4 |
| 19 | 2-[N-(2-chloroallyl)-N-isopropylamino]ethyl-2-methoxyethyldithiocarbamate. | N | 9.0 | 8.3 |
| 20 | 2-[N-(allyl)-N-isopropylamino]-ethyl-2-methoxyethyldithiocarbamate. | N<br>S | 10.1<br>23.2 | 9.9<br>22.5 |

The procedure varied slightly in the case of Example 11. The reaction mixture was not extracted with either but cooled to 5° C. and the precipitated solids filtered, washed with water until neutral to litmus and air dried at room temperature. The product melted at 62–64° C. and the melting point after recrystallizing from alcohol was 63–64° C. In all other cases the products were amber oils.

EXAMPLE 21

A reactor was charged with 35.6 grams (0.4 mole) of 3-methoxypropyl amine, 28.4 grams (0.45 mole) of concentrated ammonium hydroxide and 200 ml. of water. The solution was stirred and cooled to 5° C. and 30.4 grams (0.4 mole) of carbon disulfide added dropwise at 5–15° C. The reaction mixture was then stirred at 25–30° C. for one hour and 28.4 grams (0.45 mole) of concentrated ammonium hydroxide and 82 grams (0.4 mole) of 2-aminoethyl bromide hydrobromide added respectively. The additions were made in one portion. The temperature of the reaction mixture rose from 25 to 50° C. Stirring was continued for 24 hours at 25–30° C. and then the bottom organic layer was separated and dried in vacuo at 1–2 mm. for 18 hours. A 60% yield of 2-aminoethyl 3-methoxypropyldithiocarbamate was obtained as a viscous oil. It contained 31.2% sulfur as compared to 30.8% calculated for $C_7H_{16}N_2OS_2$.

EXAMPLE 22

Substituting 46 grams (0.4 mole) of 65% 2-methoxyethyl amine for the 3-methoxypropyl amine in the procedure of Example 21, gave a 51.5% yield of 2-aminoethyl 2-methoxyethyldithiocarbamate. The product was a viscous oil which contained 32.7% sulfur as compared to 33.0% calculated for $C_6H_{14}N_2OS_2$.

EXAMPLE 23

A reactor was charged with 17.8 grams (0.2 mole) of 3-methoxypropyl amine, 14.2 grams (0.225 mole) of concentrated ammonium hydroxide and 100 ml. of water. The solution was cooled to 5° C. and stirred while adding to it dropwise at 5–15° C. 15.2 grams (0.2 mole) of carbon disulfide. The reaction mixture was then stirred at 25–30° C. for one hour followed by the additions respectively of 14.2 grams (0.225 mole) of concentrated ammonium hydroxide and 37.2 grams (0.2 mole) of the hydrochloride of 2-morpholinylethyl chloride. The additions were made in one portion. An exothermic reaction set in causing a noticeable rise in temperature. The reaction mixture was stirred at 25–30° C. for 24 hours and then extracted with 400 ml. of ethyl ether. The ether solution was washed with water until neutral to litmus, dried over sodium sulfate and the ether removed in vacuo at a maximum temperature of 30° C. A 72% yield of 2-morpholinylethyl 3-methoxypropyldithiocarbamate was obtained as an amber oil. It contained 9.8% nitrogen as compared to 10.1% calculated for $C_{11}H_{22}N_2O_2S_2$.

EXAMPLE 24

The hydrochloride of the product from Example 1 was prepared by dissolving 22.1 grams (0.1 mole) of 2-dimethylaminoethyl 2-methoxyethyldithiocarbamate in 200 ml. of ethyl ether, cooling to 5° C. and adding dropwise at 5–20° C. 43.4 grams (0.5 mole) of a 42% solution of hydrogen chloride in methanol. The mixture was stirred at 25–30° C. for half an hour and the precipitate removed by filtration and dried at 25–30° C. The salt was a white solid which melted at 134–135° C. after recrystallizing from ethyl alcohol. It contained 10.8% nitrogen and 24.8% sulfur as compared to 10.8% nitrogen and 24.8% sulfur calculated for $C_8H_{18}N_2OS_2 \cdot HCl$.

EXAMPLE 25

As illustrative of the preparation of quaternary ammonium salts, 22.2 grams (0.1 mole) of 2-dimethylaminoethyl 2-methoxyethyldithiocarbamate was dissolved in 300 ml. of ethyl ether and cooled to 5° C. The solution was stirred and 28.4 grams (0.2 mole) of methyl iodide added in one portion. The reaction mixture has held at 5–10° C. for 2 hours, then allowed to stand at 25–30° C. for 24 hours, after which the resulting precipitate was removed by filtration, washed with ethyl ether and dried at room temperature. The product melted at 216–220° C. after recrystallizing from alcohol. It contained 6.0% nitrogen and 14.2% sulfur as compared to 6.0% nitrogen and 13.8% sulfur calculated for $C_9H_{21}IN_2OS_2$.

EXAMPLE 26

A solution was prepared from 44.6 grams (0.5 mole) of 3-methoxypropyl amine, 300 ml. of ethyl alcohol and 64 grams (1.0 mole) of concentrated ammonium hydroxide (28% ammonia). The solution was cooled to 5° C. and stirred while adding to it 38 grams (0.5 mole) of carbon disulfide dropwise at 5–15° C. The reaction mixture was then stirred at 25–30° C. for one hour. Stirring was continued while 32 grams (0.5 mole) of concentrated ammonium hydroxide and 81 grams (0.5 mole) of $C_6H_5NHCH_2CH_2Cl \cdot HCl$ were added, each in one portion. The reaction mixture was then heated at 50–60° C. for 24 hours. After cooling to 25° C., 300 ml. of water and 400 ml. of ethyl ether were added. After stirring for 15 minutes and allowing the layers to separate the ether layer was washed with water until the washings were neutral to litmus. The ether solution was dried over sodium sulfate and the ether removed in vacuo at a maximum temperature of 80–90° C. at 1–2 mm. A 50.6% yield of 2-phenylaminoethyl 3-methoxypropyldithiocarbamate was obtained as an amber liquid. It contained 9.6% nitrogen and 23.2% sulfur as compared to 9.9% nitrogen and 22.6% sulfur calculated for $$C_{13}H_{20}N_2OS_2$$

EXAMPLE 27

Substituting 57.5 grams (0.5 mole) of 2-methoxyethyl amine for 3-methoxypropyl amine in the procedure of Example 26 gave a 64.5% yield of 2-phenylaminoethyl methoxyethyldithiocarbamate as an amber liquid.

EXAMPLE 28

A solution was prepared from 22.3 grams (0.25 mole) of 3-methoxypropyl amine, 200 ml. of ethyl alcohol and 32 grams (0.5 mole) of concentrated ammonium hydroxide. The solution was cooled to 5° C. and stirred while adding to it 19 grams (0.25 mole) of carbon disulfide dropwise at 5–15° C. The reaction mixture was then stirred at 25–30° C. for one hour. Stirring was continued while 32 grams (0.5 mole) of concentrated ammonium hydroxide and 36 grams (0.25 mole) of $$C_2H_5NHC_2H_4Cl \cdot HCl$$

were added, each in one portion. The reaction mixture was then heated at 50–60° C. for 24 hours. After cooling to 25° C. 300 ml. of water and 400 ml. of ethyl ether were added. After stirring for 15 minutes and allowing the layers to separate, the ether layer was washed with water until the washings were neutral to litmus. The ether solution was dried over sodium sulfate and the ether removed in vacuo at a maximum temperature of 80–90° C. at 1–5 mm. A 47.1% yield of 2-ethylaminoethyl 3-methoxypropyl-dithiocarbamate was obtained as an amber liquid. It contained 11.6% nitrogen and 26.9% sulfur as compared to 11.7% nitrogen and 26.7% sulfur calculated for $C_9H_{20}N_2OS_2$.

EXAMPLE 29

Substituting 28.8 grams (0.25 mole) of 2-methoxyethyl amine for the 3-methoxypropyl amine in the procedure of Example 28 resulted in a 63.6% yield of 2-ethylaminoethyl 2-methoxyethyldithiocarbamate as an amber liquid. It contained 12.2% nitrogen as compared to 12.4% calculated for $C_8H_{18}N_2OS_2$.

The compounds of this invention are particularly valuable for the control of parasites in the soil. Treatment of the soil with these compounds, even in very low concentrations, is sufficient to destroy parasitic worm life and fungi. The compounds are especially toxic to parasitic worms known as nematodes in any of the egg, larvae and adult stages of their life cycle.

The problem of controlling harmful and unwanted parasites present in the soil, such as nematodes, is one of considerable complexity. In order to be an effective toxicant, a compound must be able to penetrate the normally impervious outer covering of the worm as well as the enclosing membranes of the larvae and eggs and to interfere with some vital function of the organism. While the exact mechanism of destroying the soil worm life is not fully understood, it is believed that the effective toxicants destroy or reduce to a low level the effectiveness of vital enzymes. A compound which is effective must be one that will remain in the soil in contact with the undesirable worm life for a sufficient period of time to effect the penetration of the worm and to destroy it by one means or another. To accomplish this result, it is necessary that the toxicant resist the destructive action of soil bacteria, be capable of wetting or penetrating the parasite, possess a substantial water dispersibility, be capable of ready mixture with the soil and to possess a sufficiently low vapor pressure so that it does not evaporate before its destructive action is accomplished. Since the exacting requirements of any practical agent cannot be recognized by methods other than by test, it is necessary to observe the effectiveness of chosen compounds against the life cycle of the parasite.

An experiment was conducted by preparing a suspension of the nematode *Panagrellus redivivus* in water and observing through a microscope the motility of the organisms in the presence of the dithiocarbamate. A control experiment was run at the same time in which no toxicant was employed. The nematode in aqueous suspension will flex its body at a regular rate and as the nematocide takes effect, the rate of flexing is decreased until death of the parasite occurs. The control experiment should show undiminished activity after 24 hours whereas an effective toxicant will destroy the parasite. Typical data are recorded in the table below:

Table III

| Toxicant | Conc., percent | Motility after 24 hours |
|---|---|---|
| None | 0.1 | 100 |
|  | 0.01 | 100 |
| 2-dimethylaminoethyl 2-vinyloxy-ethyldithiocarbamate | 0.1 | 0 |
| 2-dimethylaminoethyl 2-methoxyethyl-dithiocarbamate | 0.1 | 0 |
|  | 0.01 | 0 |
| 2-dimethylaminoethyl 3-methoxypropyl-dithiocarbamate | 0.1 | 0 |
|  | 0.01 | 0 |

It is now well known that an otherwise effective fungicide is often incapable of destroying fungi present in soil. The new compounds are not only useful for the general destruction of fungi but retain their activity in the presence of soil. This property was demonstrated by infesting soil with "damping off" fungi, treating the infested soil with the test material, incubating for 24 hours and sowing seeds in the incubated soil and assessing disease incidence after 10–14 days. A stock solution of the test material was pipetted into a glass jar containing one pound of infested soil. A concentration of 100 parts per million parts of soil corresponds to a dosage of 160 pounds per acre. Application within the range of 10 to 500 pounds per acre encompasses the rate of application suitable for practical control of pathogenic organisms in most cases. The "damping-off" fungi present were principally *Pythium*, *Rhizoctonia* and *Fusarium* species. The jar was sealed and the contents thoroughly mixed by vigorous shaking. The treated soil was incubated at room temperature for 24 hours, transferred to clay pots and 5 seeds of each of 4 crop plants sown in each pot. The crop plants were Black Valentine beans, Delta Pine cotton, Straight Eight cucumber and Laxton's Progress peas. The seeded pots were then incubated at 70° F. at 98% humidity to insure activity of the organism in the soil. 24 hours later the pots were removed to a greenhouse and disease assessments made within 10–14 days. The percent emergence and disease incidence was recorded. The ratings were based on inoculated, untreated and uninoculated, sterile soil treatments. For convenience in recording the data, the following rating scale was used:

Rating:                      Healthy plants out of 20
    E _____ 18–20.
    P _____ 15–17.
    F _____ 12–14.
    N (not effective) _____ 11 or less.

The results are recorded below:

Table IV

| Toxicant | Soil fungicide rating (pounds per (acre) | | |
|---|---|---|---|
| | 160 | 80 | 48 |
| 2-dimethylaminoethyl 2-methoxyethyl-dithiocarbamate | | E | P |
| 2-dimethylaminoethyl 2-vinyloxyethyl-dithiocarbamate | E | P | N |
| 2-dimethylaminoethyl 3-methoxypropyl-dithiocarbamate | E | E | F |
| 2-diethylaminoethyl 2-methoxyethyl-dithiocarbamate | E | | P |
| 2-diethylaminoethyl 3-methoxypropyl-dithiocarbamate | P | | P |
| 3-dimethylaminopropyl 3-methoxypropyl-dithiocarbamate | F | | N |
| 3-dimethylaminopropyl 2-methoxyethyl-dithiocarbamate | P | | P |
| 1-methyl-2-dimethylaminoethyl 3-methoxy-propyldithiocarbamate | E | | P |
| 1-methyl-2-dimethylaminoethyl 2-methoxy-ethyl-dithiocarbamate | E | | N |
| 2-diisopropylaminoethyl 2-methoxyethyl-dithiocarbamate | E | | N |
| 2-morpholinoethyl 2-methoxyethyl-dithiocarbamate | F | | F |
| 2-dipropylaminoethyl 2-methoxyethyl-dithiocarbamate | E | | N |
| 2-dipropylaminoethyl 3-methoxypropyl-dithiocarbamate | P | | N |
| 2-[N-(2-chloroallyl)-N-isopropylamino]-ethyl-3-methoxypropyldithiocarbamate | P | | N |
| 2-diisopropylaminoethyl 3-methoxypropyl-dithiocarbamate | P | | F |
| 2-[N-isopropyl-N-(2-propynyl)amino] ethyl 2-methoxyethyldithiocarbamate | P | | P |
| 2-diallylaminoethyl 3-methoxypropyl-dithiocarbamate | P | | F |
| 2-diallylaminoethyl 2-methoxyethyl-dithiocarbamate | P | | P |
| 2-[N-(2-chloroallyl)-N-isopropylamino]-ethyl-2-methoxyethyldithiocarbamate | P | | F |
| 2-[N-(allyl)-N-Isopropylamino] ethyl-2-methoxy-ethyldithiocarbamate | P | | F |
| 2-morpholinoethyl 3-methoxypropyl-dithiocarbamate | P | | F |
| The hydrochloride of 2-dimethylaminoethyl 2-methoxyethyldithiocarbamate | P | | F |
| The product of Example 25 | P | | P |

Similar tests with derivatives of alkylthioalkyldithiocarbamic acids, as for example methylthioethyldithiocarbamic acid, indicated that replacing the oxygen in the ether group by sulfur yielded comparable soil fungicide properties.

General fungicidal effectiveness was demonstrated by tests in vitro on potato dextrose agar. The agar was inoculated with the test organism and the mean colony diameter of growth measured in millimeters 8 days after inoculation. Employing 2-dimethylaminoethyl 2-methoxyethyldithiocarbamate and test organisms identified as follows, V = *Verticillium albo-atrum*
R = *Rhizoctonia solani*
SR = *Sclerotium rolfsii*
PC = *Phytophthora cinnamomi*
FN = *Fusarium oxysporum* f. *niveum*
SS = *Sclerotinia sclerotiorum*
PU = *Pythium Ultimum* the following results were obtained:

Table V

| Conc., p.p.m. | Millimeters of growth | | | | | | |
|---|---|---|---|---|---|---|---|
| | V | R | SR | PC | FN | SS | PU |
| 50 | 0 | 0 | 0 | 0 | 0 | 0 | 0 |
| 25 | 65 | 0 | 0 | 0 | 0 | 69.5 | 0 |
| Control | 84.5 | 85 | 88 | 84.5 | 76 | 85 | 85 |

It is intended to cover all changes and modifications of the examples of the invention herein chosen for purposes of disclosure which do not constitute departures from the spirit and scope of the invention.

What is claimed is:

1. A compound of the formula

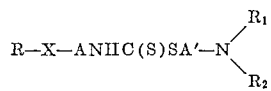

where R represents a radical selected from the group consisting of alkyl of one to eight carbon atoms inclusive, 3,6-dioxaheptyl, vinyl, allyl, phenyl and benzyl, X is selected from a group consisting of oxygen and sulfur, A represents lower alkylene, A′ represents alkylene containing less than four carbon atoms which separates the sulfur and nitrogen by at least two carbon atoms, $R_1$ is selected from a group consisting of hydrogen, alkyl of one to four carbon atoms inclusive, allyl, 2-chloroallyl, propynyl, phenyl and cyclohexyl, $R_2$ is selected from a group consisting of hydrogen, alkyl of one to four carbon atoms inclusive and allyl and $R_2$ taken with $R_1$ and the nitrogen atom represents the morpholine ring.

2. A compound of the formula $$R\text{—}O\text{—}ANHC(S)SA'\text{—}NH_2$$

where R represents alkyl of one to eight carbon atoms inclusive, A represents lower alkylene and A′ represents alkylene containing less than four carbon atoms which separates the sulfur and nitrogen by at least two but not more than three carbon atoms.

3. A compound of the formula

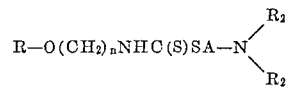

in which $R_1$ and $R_2$ represent alkyl containing less than four carbon atoms and R represents alkenyl containing less than 4 carbon atoms, n is an integer at least one but less than six and A represents alkylene containing less than four carbon atoms which separates the sulfur and nitrogen by at least two carbon atoms.

4. A compound of the formula

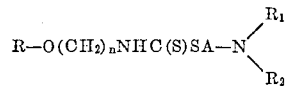

in which R, $R_1$ and $R_2$ represent alkyl containing less than four carbon atoms, n is an integer at least two but less than four and A represents alkylene containing less than four carbon atoms which separates the sulfur and nitrogen by at least two carbon atoms.

5. 2-dimethylaminoethyl 2-methoxyethyldithiocarbamate.

6. 2-diethylaminoethyl-2-methoxyethyldithiocarbamate.

7. 2-diethylaminoethyl 3-methoxypropyldithiocarbamate.

8. 2-dimethylaminoethyl 3-methoxypropyldithiocarbamate.

References Cited in the file of this patent

UNITED STATES PATENTS

| 2,588,428 | Stewart et al. | Mar. 11, 1952 |
| 2,756,249 | Kirshenbaum et al. | July 24, 1956 |
| 2,841,519 | Lo et al. | July 1, 1958 |
| 2,842,583 | Meuly | July 8, 1958 |
| 2,895,980 | Harman et al. | July 21, 1959 |
| 2,901,499 | Tilles et al. | Aug. 25, 1959 |

FOREIGN PATENTS

| 121,219 | Australia | Mar. 19, 1946 |
| 1,045,586 | France | July 1, 1953 |

OTHER REFERENCES

Damiens, Ann. Chim., vol. 6 (1951), pages 835–879.